US006405319B1

(12) United States Patent
Arnold et al.

(10) Patent No.: US 6,405,319 B1
(45) Date of Patent: Jun. 11, 2002

(54) VERIFICATION SYSTEM FOR INFORMATION TRANSFERS OVER A COMPUTER NETWORK

(75) Inventors: Nicolas Georg Arnold, Menlo Park; Peter A. Daley, Burlingame; Narendra K. Ghosh, Menlo Park; William Hsu, Saratoga; Michael C. Lai, Mountain View, all of CA (US)

(73) Assignee: Buildpoint Corporation, Redwood City, CA (US)

( * ) Notice: Subject to any disclaimer, the term of this patent is extended or adjusted under 35 U.S.C. 154(b) by 0 days.

(21) Appl. No.: 09/492,886

(22) Filed: Jan. 27, 2000

(51) Int. Cl.[7] .................................................. H04L 9/00
(52) U.S. Cl. ...................... 713/201; 380/278; 380/283
(58) Field of Search ................................. 713/201, 200, 713/202; 380/283, 278

(56) References Cited

U.S. PATENT DOCUMENTS

| | | | |
|---|---|---|---|
| 4,654,718 A | 3/1987 | Sueyoshi | 358/257 |
| 5,003,405 A | 3/1991 | Wulforst | 358/400 |
| 5,604,803 A | 2/1997 | Aziz | 380/25 |
| 5,629,982 A | 5/1997 | Micali | 380/30 |
| 5,633,909 A | 5/1997 | Fitch | 379/15 |
| 5,666,420 A | 9/1997 | Micali | 380/30 |
| 5,689,642 A | 11/1997 | Harkins et al. | 395/200.04 |
| 5,715,402 A | 2/1998 | Popolo | 395/237 |
| 5,748,738 A | 5/1998 | Bisbee et al. | 380/25 |
| 5,754,306 A | 5/1998 | Taylor et al. | 358/400 |
| 5,805,298 A | 9/1998 | Ho et al. | 358/402 |
| 5,859,967 A | 1/1999 | Kaufeld et al. | 395/186 |
| 6,012,144 A * | 1/2000 | Pickett | 713/201 |
| 6,025,931 A | 2/2000 | Bloomfield | 358/402 |
| 6,044,471 A * | 3/2000 | Colvin | 713/202 |
| 6,098,173 A * | 8/2000 | Elgressy et al. | 713/201 |

\* cited by examiner

*Primary Examiner*—Norman M. Wright
(74) *Attorney, Agent, or Firm*—Charles J. Kulas; Townsend and Townsend and Crew, LLP

(57) ABSTRACT

A system for validating network communication, such as e-mail. A person sending information to a previously unverified recipient first enters "Address Book" information about the unverified recipient into the sender's e-mail system. Part of this initial information includes the recipient's e-mail address and a way of communicating with the intended recipient other than by using the e-mail address. For example, regular mail, fax, or other means can be specified. When the sender sends the information to the intended recipient, the recipient is not able to receive the information until an identification code is entered by the intended recipient. The identification code is transferred via the different way of communicating that does not use the intended recipient's e-mail address. For example, the code can be sent via fax. The intended recipient then logs on to the e-mail system and enters their user name and the code. When the recipient logs on for the first time and enters the QAN, the recipient's e-mail account is associated with the sender's entry for that intended user in the sender's private address book. Provision is also made for a representative of the recipient, as opposed to the actual recipient, to perform the logon and receive the information. As part of the logon process, the person logging in is asked to attest that they are the intended recipient or a representative of the intended recipient. The initial logging on of the intended recipient, or the intended recipient's representative, generates an automatic fax to the intended recipient's fax number. This is the same fax number as used to convey the QAN to the intended recipient. This fax upon login acts to defeat any attempt by an outside party to intercept and use the QAN to log on and impersonate the intended recipient. The fax verification upon login is repeated for the first 5 to 10 documents sent by e-mail to recipients who are new users of the system.

7 Claims, 12 Drawing Sheets

Important: To receive your Invitation-To-Bid electronically, please complete the following 2 step registration process.

Registration ➔ Personal and Company Information

**Personal and Company Information
required fields marked by***

Personal Information

| | | |
|---|---|---|
| First name: | * | QAN |
| Middle name/initial: | | test |
| Last name: | * | user |
| Job title: | * | boss |

Company Information

| | | |
|---|---|---|
| Company name: | * | test comp |
| Company type: | * | General Contractor ▼ |
| Address 1: | * | Test Rd |
| Address 2: | | |
| City: | * | Testen |
| State: | * | Delaware ▼ |
| Zip code: | * | 54654 - |
| Country: | * | USA ▼ |

Contact Information

| | | | | |
|---|---|---|---|---|
| Phone: | * | 650 | 620 | 1501 |
| Fax: | * | 650 | 620 | 1508 |

Enter a number for faxed invitations-to-bid.

E-mail:

Pager:

User Information

Tips for creating a username and password:
- Usernames may only include lowercase letters and dashes
- Passwords must include at least six characters
- Passwords may not include spaces
- Passwords may not include single or double quotes

| | | |
|---|---|---|
| Username: | * | qantest1 |
| Password: | * | |
| Re-type Password: | * | |

About sharing passwords.

Your question and answer are used to verify your identity when you choose BuildPoint.

| | | |
|---|---|---|
| Question: | * | a? |
| Answer: | * | b |

[ Reset ] [ Cancel ] [ Continue ]

*FIG. 2A.*

INVITATION TO BID

Date: 11/9/99 2:56:10 PM                                                                 Pages: 1

| TO: | FROM: |
|---|---|
| Attention to: test recipient | Sender Name: Narendra Ghosh |
| Company Name: test company | Company Name: BuildPoint |
| BuildPoint User Name: | BuildPoint User Name: nkghosh |
| Phone Number: | Phone Number: (768) 768-8768 |
| Fax Number: (650) 620-1508 | Fax Number: (503) 218-6941 |

Project Name: Test project
Bid Name: Test Bid
UCI/CSI Codes: Not Available
Location: Menlo, California 94038
Estimator: Narendra Ghosh      Phone: (768) 768-8768     Fax: (503) 218-6941
        E-mail: nkghosh@buildpoint.com
        1875 C. St.
        Mountain View, California 94043

Bid Information                              Project Information
                                                 Project Owner:
Bid Status: ITB's for Sub's                      Project Type: Industrial
Est. Total Bid Value: $100,000 - $200,000        Estimated Project Value: $500,000 -
Indicate Interest by: 1/1/2001 1:15 AM PT         $1,000,000
Submit Bid by: 2/3/2002 1:00 AM PT               Sched. Period: 02/01/2001 - 03/01/2002

Bid Description:

Project Description:
This is not real

Plans available for viewing at:
Plans available for purchasing at:

---
To respond, login to BuildPoint.com by entering your Quick Access Number:
3EAADRN8
*-OR-*
Complete the following fields and fax back to us at: (503) 218-6941

☐ Yes! I'm Bidding          ☐ No, I'm Not Bidding
Bidding on the following spec sections (CSI Codes):_____
---

Make BuildPoint.com a Part of Your Daily Routine          Quick Access Number
* Would you like to search for and receive new business leads?      (QAN): 3EAADRN8
* Are you looking for a place to centralize all your lead management activities?
* Do you want a better way to manage, broadcast and track your ITBs?

We invite you to join our community of A/E/C professionals at www.buildpoint.com
For support or access problems, call 1-877-BUILDPT or email support @ buildpoint.com

*FIG. 2B.* user: qantest1  company: test comp

| General | My BuildPoint | Bid Manager | Lead Manager | Directory |

Lead Manager → New                              Showing 1-1 of 1

Enter a Quick Access Number

[ go ]

☑ Help
☑ My Profile
☑ Logout

| Bid Package | (QAN) Project Name | Bid Date | Company Last Update |

☐ Test bid (3EAADRN8)    Test project    2/3/2002 1:00 AM PT    BuildPoint 11/09/1999

Tools

☑ Find Business

Folders

☑ Manage Folders
☐ New
🗑 Trash Bin

Check All | Clear All                                             Previous / Next 10

[ Reply ] [ Delete ]

—— Select Folder ▼ ——    [ Move To ]

*FIG. 2C.* user: qantest1 company: test comp

Bid Access

The Invitation to Bid you requested is intended for test recipient of test company. Please check one of the following:

- ⦿ I am test recipient.

- ○ I am responding on behalf of test recipient.

- ○ I am not, do not know, and have never heard of test recipient.

**NOTE: Narendra Ghosh, the sender of this invitation will be asked to authenticate and verify your response.
Please do not falsify any information.**

BID INFORMATION for QAN: 3eaadrn8

Bid Title: Test bid
Bid Description:
Bid Estimated Value: $
Project Start Date:
Bid Deadline: 2/3/2002  1:00 AM PT Submit

*FIG. 2D.*

Profile: QAN USER2

Contact name: QAN user2
BuildPoint username: qantester2
Title: tester
Company name: Tst Inc
Company description: General Contractor
Address 1: Test Rd.
Address 2:
Address 3:
City: Testen
State: Florida
Zip: 54654
Country: USA
Phone: (650) 620-1501
Fax: (659) 620-1508
Email:
URL:
CSI Codes:
Typical project size:
License #:
Areas served:
Federal ID:
Labor:
M/W/D/V/SBE:
Custom Label 1:
Custom Label 2:
Custom Label 3:
Custom Label 4:

Comments:

| Add to Personal Directory | Close |

*FIG. 2E.* user: 546546546 company: 465

Sorry, you don't have access to view this bid.

Please review the contact information on the ITB and notify the intended recipient that you have erroneously received this document.

Thanks,

BuildPoint Corporation

| Go to BuildPoint Main Page |
|---|

*FIG. 2G.*

ACCESS CONFIRMATION

Date: 1/20/00 9:34:20 PM

| TO: | FROM: |
|---|---|
| Attention to: QAN Tester<br>Company Name: QAN Testers<br>BuildPoint User Name: qantester<br>Phone Number:<br>Fax Number: (650) 620-1508 | BUILDPOINT.COM<br><br>Cust. Service Phone: 1-877-BUILDPT<br>Cust. Service Email: support@buildpoint.com |

Our records indicate that you accessed the Invitation-to-Bid described below on 01/20/00. If this information is *inaccurate* or if you are not a BuildPoint registered user, please either call us at 1-877-BUILDPT or e-mail us at support@buildpoint.com to clarify this apparent conflict. Please note that this notification is generated to coordinate and assure the quality of communications between BuildPoint community members.

User Information

Username: qantester
Name:    QAN Tester
Title:     QAN Tester
Role:

Company Information

Company Name: Qan Testers
Company Type: Other

Contact Information

Address: QAN Way
         QAN City, Rhode Island 12345

Phone: (650) 620-1532
Fax:    (650) 620-1508
Email:
Pager:

---

Bid Information

Bid Name: QAN Test

Est. Bid Value:    Not selected
Indicate Interest by: 1/21/2000 3:00 PM PT
Submit Bid by: 3/3/2000 4:00 PM PT

Project Information

Project Name:   Another Project
Project Owner:
Project Type:  Other
Estimated Project Value:
Estimated Date:

Make BuildPoint.com a Part of Your Daily Routine
* Stop the daily barrage of faxes.
* Respond quickly and easilly to a large number of faxes.
* Manage and track all your invitations in one centralized location.

For support or access problems, call 1-877-BUILDPT or email support @ buildpoint.com

*FIG. 2H.*

VERIFICATION SYSTEM FOR INFORMATION TRANSFERS OVER A COMPUTER NETWORK

BACKGROUND OF THE INVENTION

This invention relates in general to computer networks and, more specifically, to a system for verifying, and assuring, a proper recipient for information transfers over computer networks.

As computer networks such as the world wide Internet, corporate intranets, local area networks (LANs), etc., grow in popularity, it becomes important to provide for secure transfer of information over such networks.

For example, the use of electronic mail, or "e-mail," is a very common and quick way to transfer information from a sender to a receiver over a network. As the use of e-mail becomes more common, much of traditional correspondence is being handled electronically over networks.

However, a problem arises where sensitive information needs to be transferred via e-mail over a network. This is because e-mail is notoriously unsecured. Part of the reason for this is that e-mail information is relayed among several, or many, computers, before it reaches its intended destination. Another reason that e-mail is not a secure form of transmission is that individual e-mail accounts are sometimes accessible to other than the intended recipient. This can be due to either to carelessness on the intended recipient's part, illegal or dishonest acts on the part of a third party, etc. The nature of electronic media and communication often makes it relatively easy for a third party to view, appropriate, or otherwise obtain another person's information.

A further problem with e-mail communication is that one does not know the actual source of a received bit of information. In many of today's business dealings, a person needs to know, with a good degree of reliability, that they are dealing with the right person. E-mail transmissions are not confined to any one computer or any one place. An e-mail sender, or someone who is replying to another e-mail message, can originate their transmission, or response, from anywhere in the world. Note that these problems are not as likely with traditional forms of communication, such as regular mail, facsimile transmission, telephone communication, telegrams, etc.

Despite the potential problems with e-mail transmissions, it is desirable to be able to use electronic communication over a network because of the speed of communication, cost, ability to integrate communications with other computer applications, etc.

Thus, it is desirable to provide a system that overcomes some or all of the problems discussed above.

SUMMARY OF THE INVENTION

The present invention provides verification mechanisms to be used in network communication, such as e-mail. A person sending information to a previously unverified recipient first enters "Address Book" information about the unverified recipient into the sender's e-mail system. Part of this initial information includes the recipient's e-mail address and a way of communicating with the intended recipient other than by using the e-mail address. For example, regular mail, fax, or other means can be specified.

When the sender sends the information to the intended recipient, the recipient is not able to receive the information until an identification code is entered by the intended recipient. The identification code is transferred via a different method that does not use the intended recipient's e-mail address.

In a preferred embodiment, a fax is sent to the intended recipient that includes the identification code, referred to as a "Quick-Access Number" (QAN). The intended recipient then logs on to the e-mail system and enters their user name and QAN.

When the recipient logs on for the first time and enters the QAN, the recipient's e-mail account is associated with the sender's entry for that intended user in the sender's private address book. Provision is also made for a representative of the recipient, as opposed to the actual recipient, to perform the logon and receive the information. As part of the logon process, the person logging in is asked to attest that they are the intended recipient or a representative of the intended recipient. The initial logging on of the intended recipient, or the intended recipient's representative, generates an automatic fax to the intended recipient's fax number. This is the same fax number as used to convey the QAN to the intended recipient. This fax upon login acts to defeat any attempt by an outside party to intercept and use the QAN to log on and impersonate the intended recipient. The fax verification upon login is repeated for the first 5 documents sent by e-mail to recipients who are new users of the system.

In a preferred embodiment, the system of the present invention is designed to handle various aspects of building, or contractor, bidding. The system automatically tracks correspondence between senders and recipients. Multiple senders may make individual entries into their private address books for the same recipient. In each case, the new sender creates an entry that sends a fax with a new QAN to the intended recipient. The intended recipient must then log on and enter the new QAN before the entry in the new sender's personal address book is associated with the recipient's logon account. The sender is given a chance to synchronize information that the recipient has typed in such as company name, physical address, etc. This allows the sender to keep an updated address book entry. Addresses can also be made public so that any senders may use the public address associated with a recipient's.

In one embodiment, the invention provides a method for validating communications between a sending system and a human recipient over a computer network. The method includes steps of associating a network contact address with the human recipient; causing an initial send of information from the sending system to the human recipient over the computer network; in response to the step of initiating a send, providing an identification code to the human recipient by a method that does not use the network contact address; and detecting the submission of the identification code in association with the network contact address before completing the send of information from the sending system to the human recipient over the computer network.

BRIEF DESCRIPTION OF THE DRAWINGS

FIG. 2A is an example of a web page registration form for registration of new users;

FIG. 2B is an example fax that a recipient receives;

FIG. 2C is an example of a web page showing a list of messages;

FIG. 2D is an example of a query to determine who is responding to a communication;

FIG. 2E is an example of a profile for a user;

FIG. 2G is an example of an error message;

FIG. 2H is an example of an access confirmation memo; and

DETAILED DESCRIPTION OF THE SPECIFIC EMBODIMENTS

An embodiment of this invention is incorporated into a suite of software products referred to as "BuildPoint."

Figure 3:
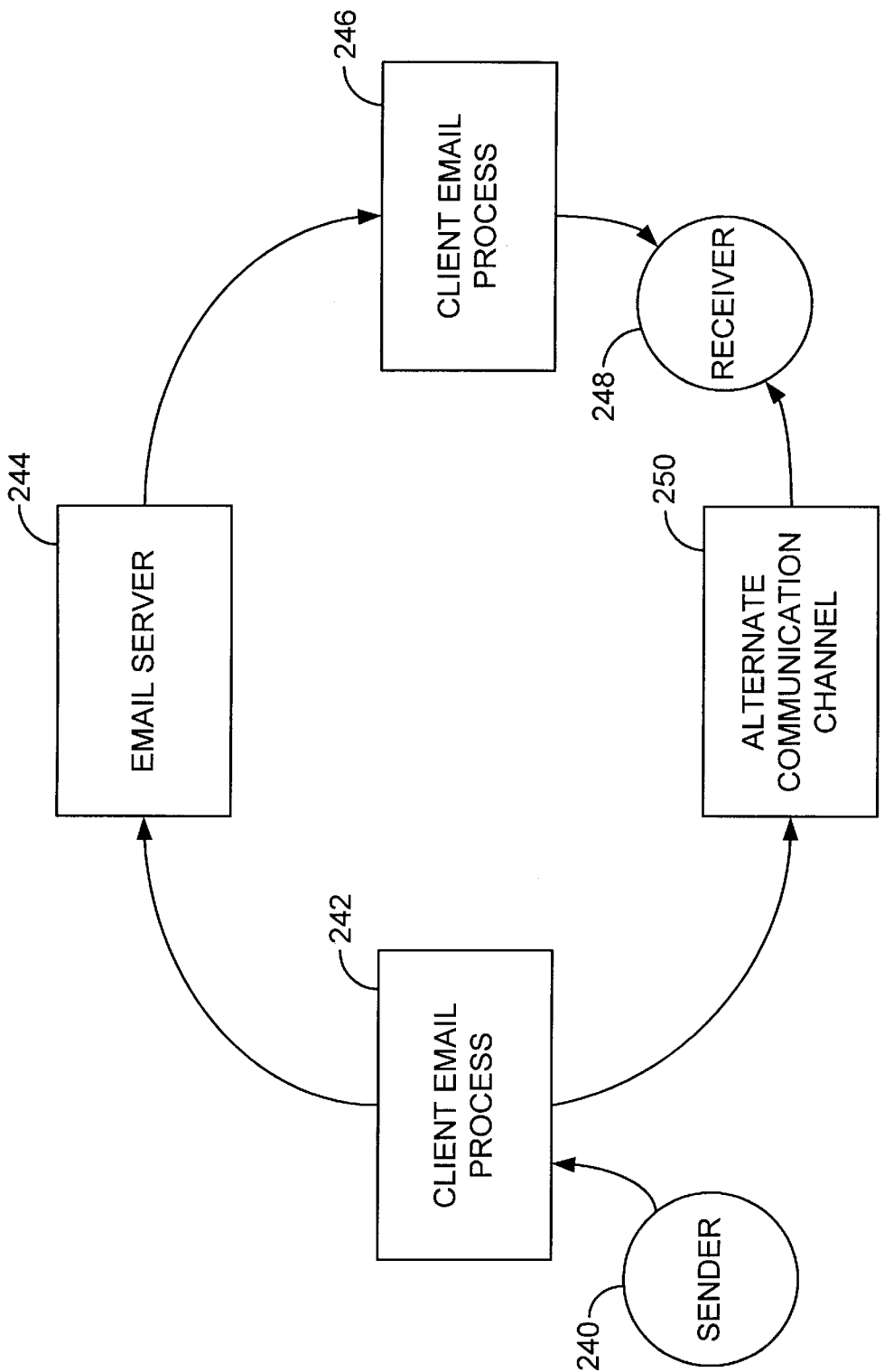
FIG. 3 shows a general overview of a method of the present invention.

FIG. 3 shows a general overview of the method of the present invention.

The present invention is a system for providing verification methods to be used in conjunction with electronic transfer of information. For example, one application is to provide verification for e-mail transferred over a network such as the Internet, or a corporate intranet. Sender 240 is a human user of the system who is desiring to send information to receiver 248. Typically, the sender and receiver are humans or users who operate computers or terminals.

For example, sender 240 operates a computer local to sender 240 which executes a process such as client e-mail process 242. Client e-mail process 242 allows sender 240 to compose a message, designate information to be sent, etc., and to designate recipients, of the information. For example, designation of recipients can be by selecting predefined entries in an address book.

Once sender 240 has created, or designated, information to be transferred, the information is sent to e-mail server 244 as, for example, via a computer network. E-mail server 244 determines how to relay the information. The information may be relayed, or transferred, between many servers before it arrives at receiver 248's local computer and is detected by client e-mail process 246. The verification system, unlike traditional e-mail systems, may hold the information at a point such as client e-mail process 242, e-mail server 244, some other server (not shown) or at another point, before allowing it to be transferred to client e-mail process 246 on receiver 248's local computer. Instead, receiver 248 may receive notification that a transmission intended for receiver 248 exists. In order to receive the actual transmission, receiver 248 must enter a code, also referred to as a "Quick Access Number" (QAN) which must be entered into the verification system before completion of the transfer of information.

A preferred embodiment uses an alternative communication channel. Examples of alternate communication channels can be fax, telephone, physical mail, telegram, etc. In general, any mode of communication other than the electronic mode of communication being attempted via the path described above, is acceptable as an alternate communication channel. This channel is illustrated by alternate communication channel 250. Note that alternate communication channel 250 can even be an electronic communication channel that is distinct from the communication channel of client e-mail process 242, e-mail server 244 and client e-mail process 246. For example, another e-mail program, channel, link, etc. may exist. Such may be the case where receiver 248 has more than one e-mail account, user name, etc. Preferably, the alternate communication channel is one that is known to be a reliable mechanism for communicating with receiver 248.

In a preferred embodiment, alternate communication channel 250 is achieved by fax.

The QAN is sent via fax to receiver 248. Typically, the fax will contain a message that the QAN is required to access e-mail that may, or may not, already be indicated in the receiver's e-mail mailbox. In turn, the notification that information is waiting to be transferred to receiver 248 includes a message that the code, or QAN necessary to access this information is being provided by a fax to a specific number, or location, known by receiver 248.

Receiver 248 then enters the QAN into the verification system to obtain the transferred information. For example, receiver 248 could enter the QAN into a dialog box generated by client e-mail process 246. The QAN is then sent back to e-mail server 244, client e-mail process 242, or another process. Upon verification that this is, indeed, the QAN associated with the information sent from sender 240, the actual information is transferred to client e-mail process 246 as, for example, to a machine local to receiver 248.

In another embodiment of the system sender 240 may desire to send receiver 248 a message via system 244 but does not have the proper targeting information (such as an e-mail address) to do so. Sender 246 can use alternative information (such as a fax number) regarding receiver 248 to send receiver 248 limited information via system 250. Using this secure messaging system, sender 240 sends a message via client 242 and a QAN via system 250 to receiver 248. The message will be queued within e-mail server 244 waiting for any client (such as client 246) to contact it with the proper QAN. Server 244 will release the queued message to the client which has given it the right QAN. In this instance, receiver 248 will have received the QAN via system 250 along with a message to use any client to contact server 244 to receiver the intended message. Receiver 248 will logon to client 246 and enter the QAN, the system 246 will in turn contact system 244 and using the QAN to gain access to the message. The receiver 248 will than finally received the system.

Details and refinements to the basic method discussed above in connection with FIG. 3 are presented below. Note that verification system can work in conjunction with an existing, third-party, e-mail system. In such case, the verification system can intercept communications from sender 240 to a third-party client e-mail process 242, and other processes of the e-mail system. A preferred embodiment of the invention uses an integrated suite of software components to provide the verification system and e-mail delivery system along with other features provided by software, and hardware.

Figure 1A:
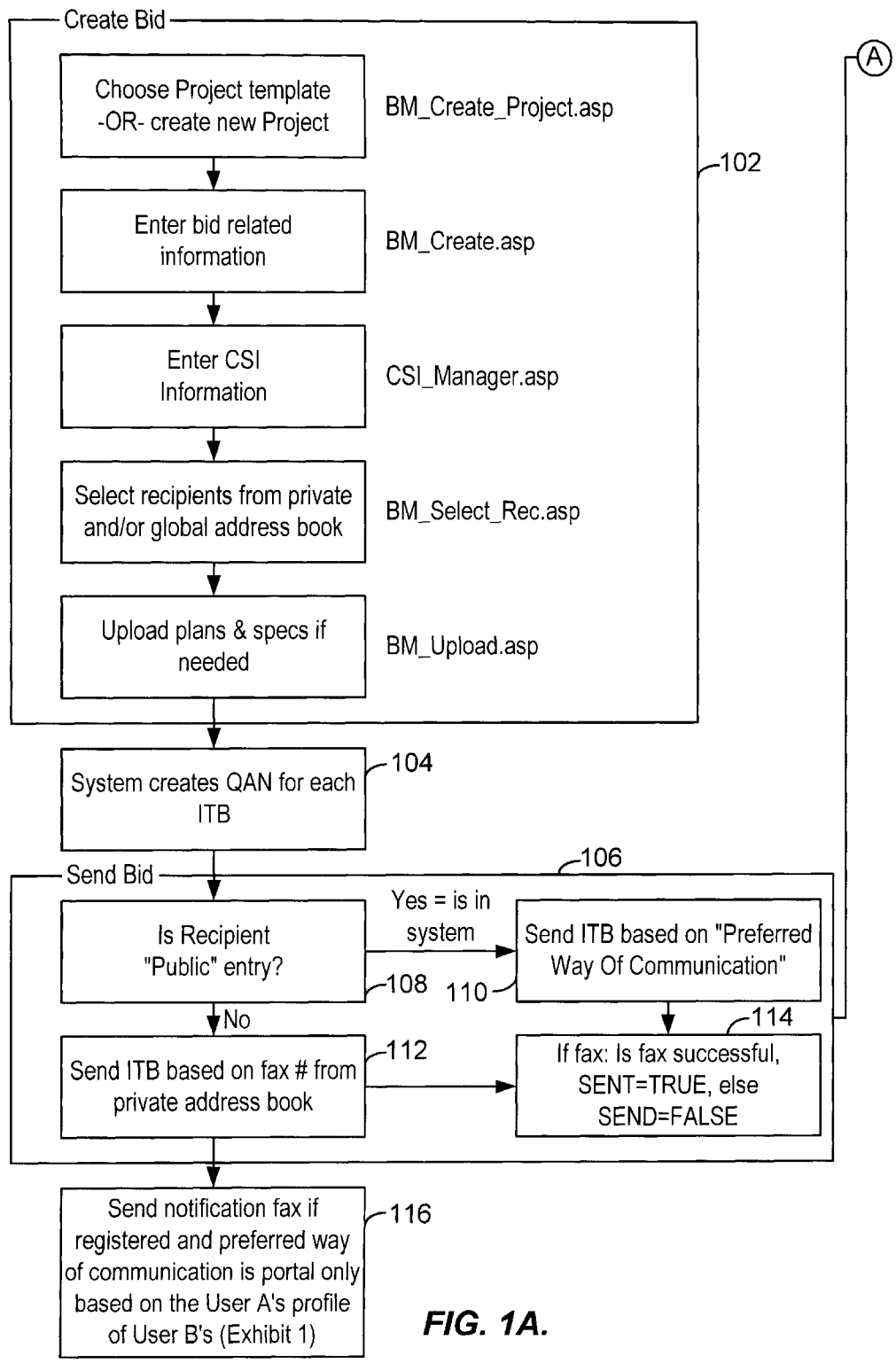
FIG. 1A is a flow chart illustrating basic steps used by a sender in an e-mail system of the present invention.
Figure 1B:
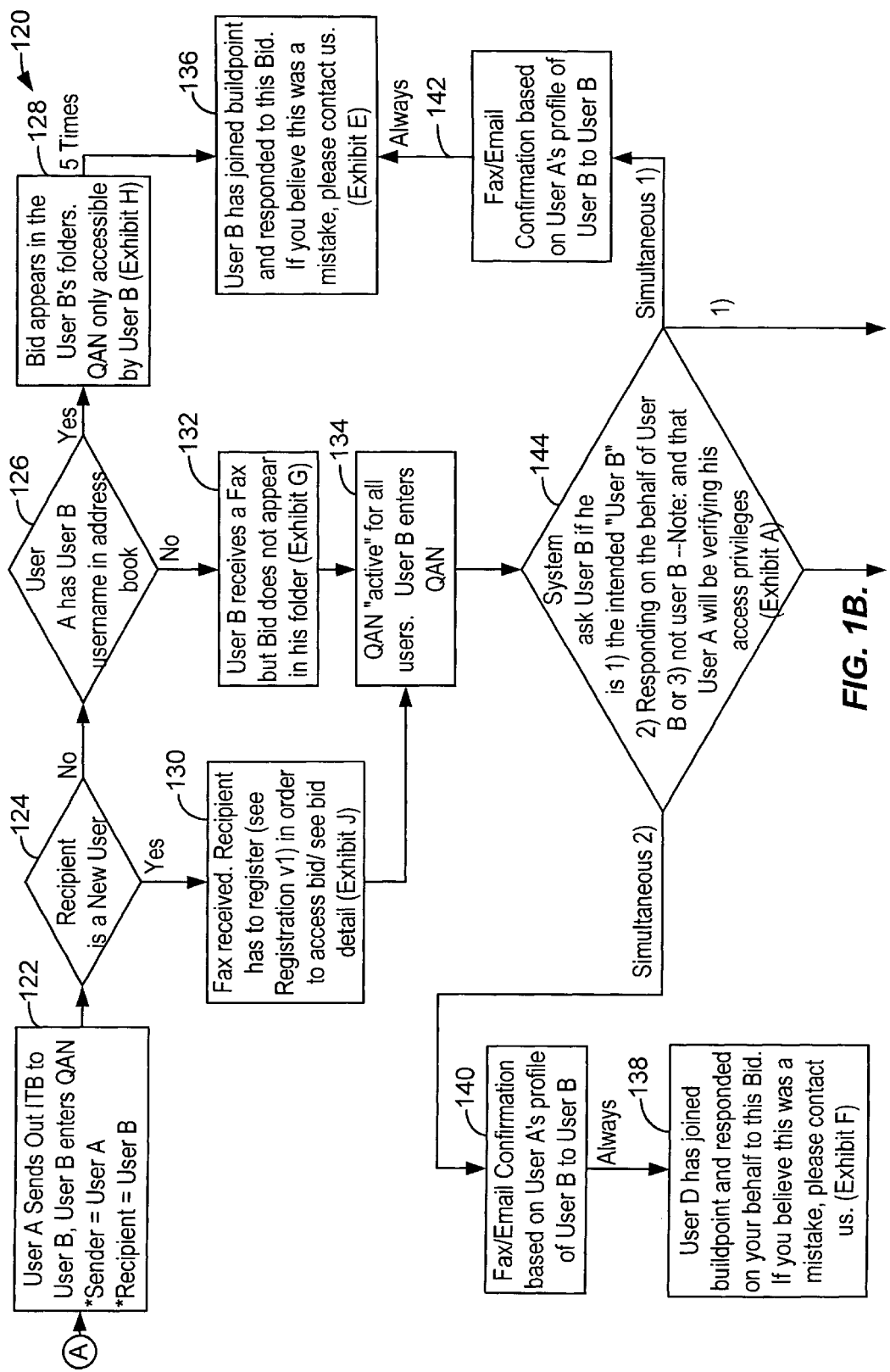
FIG. 1B is a second part of the flow chart of FIG. 1A.
Figure 1C:
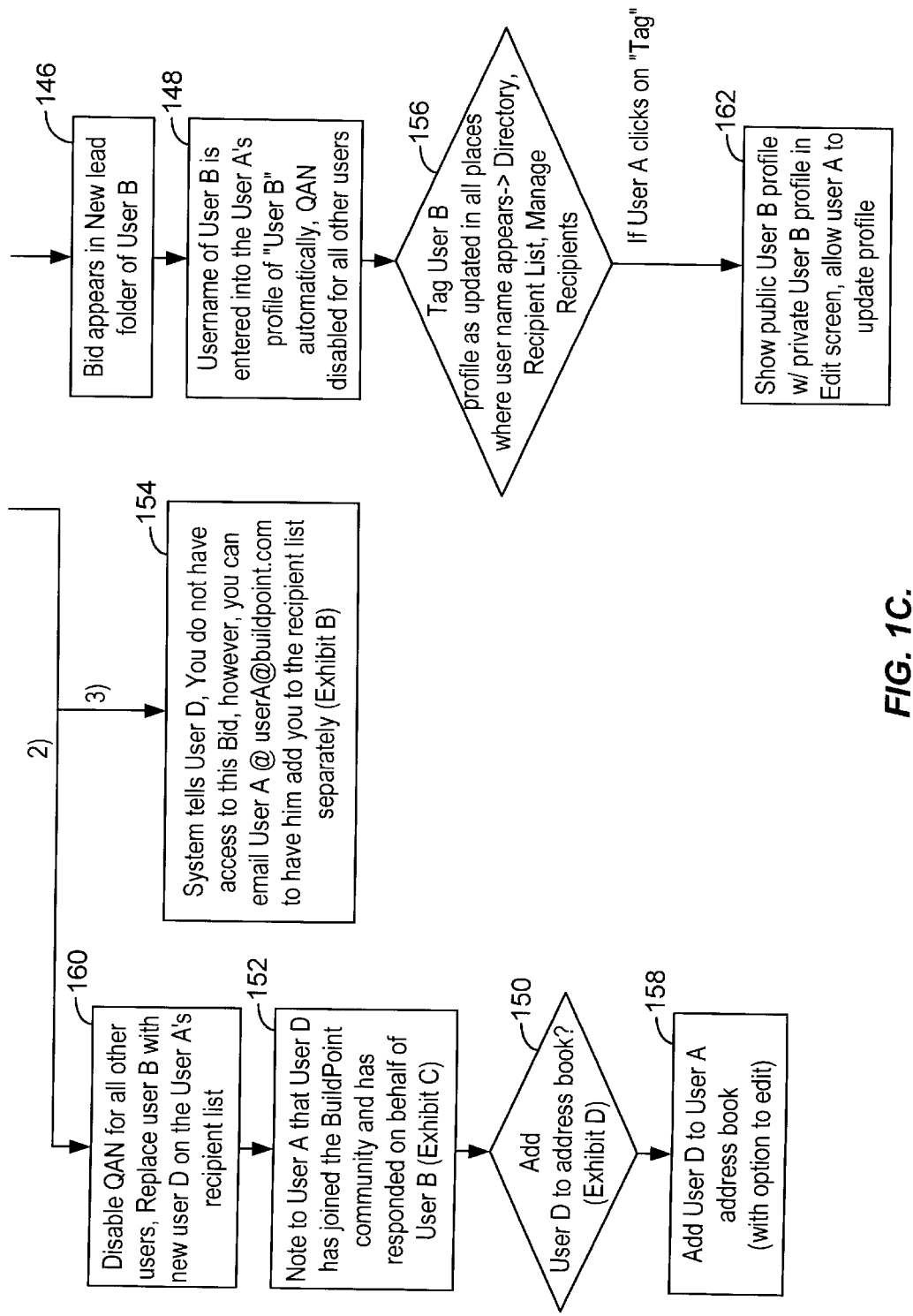

FIGS. 1A and 1B illustrate a flowchart that describes basic steps in a method of the present invention, developed and distributed by BuildPoint Corporation, also known as BuildPoint.com. In FIG. 1A, flowchart 100 illustrates basic steps used by a sender in an e-mail system of the present invention. In FIG. 1A, a sender desires to send one or more e-mail messages over a network, such as the Internet, to receivers. Note that, although the specific example of contract bids, Invitations-To-Bid (ITB), etc. are used in a description of the invention, the scope of the invention can apply to any application, or transfer of information, over any network. Box 102 includes steps performed by, e.g., a general contractor, in creating a bid to send to sub-contractors. In this example, the general contractor is referred to as the "sender" of information and the sub contractors are referred to as "receivers" or "recipients" of the information.

The e-mail program of the present invention is similar to e-mail programs that are commonly known in the art. For example, the sender can create address book entries. Such entries can be public or private. The public entries are accessible by any of many senders that may be using the same e-mail program. For example, a group of employees at a corporation may have access to a global, or public, e-mail address book. The private address book contains entries that are only viewable by a specific sender. In other words, it is that unique sender's personal address book.

Entries in the address book not only include e-mail addresses of recipients, but can also include other information about a recipient. For example, the recipient's physical e-mail address, fax number, telephone number and other information can be associated with a recipient's name, or nickname, in the address book. More importantly, the entries in the address book contain a username attribute which is the system's methodology for establishing a secure communication channel between two parties. If the sender's address book has the recipient's entry with a username, the system assumes that prior communication had occurred via the same channels and the verification process referred to in FIG. 1B is sped up to step 126 and 128. These steps will be discussed in detail in the following paragraphs.

Referring to FIG. 1A, after the general contractor prepares information for sending, step 104 is executed. At step 104, the system creates a Quick Access Number (QAN) for each transmission that is to take place. In the present example, the general contractor is sending ITBs to various recipients.

Once the sender indicates that the e-mail information is to be transmitted, the system of the present invention executes the steps in box 106 to actually transfer the information to recipients.

In box 106 of FIG. 1A, step 108 is first executed to check whether a designated recipient is a public address book entry. If so, it is known that this recipient is validated and exists within the verification system so step 110 is executed. Step 110 transfers the information based on a "Preferred Way of Communication" such as mail, e-mail, fax, etc. This preferred way of communication has previously been recorded in the recipient's profile.

If, at step 108, it is determined that the recipient does not have a valid entry in the current public address book, then step 112 is executed. At step 112, the information is set via the profile associated with the entry in the sender's personal address book. It is assumed that the recipient exists as an entry in either the public or private address books. If the information is to be sent by electronic means, such as over a network, a notification fax is send to the recipient to ensure that the recipient of the electronically transferred information also has another notification means to prevent any theft of the electronically transferred information. This is shown at step 116.

If the preferred way of communication is by fax, step 114 is executed to check whether the fax is successfully sent. At this point, a flag is set to indicate whether the fax was successfully sent or not. A fax check would occur if either step 112 used a fax to back up an electronic transmission of information, or if steps 112 or 110 used a fax as the preferred communication method to transfer the information.

After the steps in box 106 are completed execution continues to the flowchart of FIG. 1B as indicated by connection "A."

In FIG. 1B, flowchart 120 illustrates basic steps used to perform transfer and verification in the system of the present invention. Flowchart 120 is entered at step 122 to pick up from flowchart 100 of FIG. 1A as indicated by connector "A."

At step 122, the general contractor's or sender's information is transferred to the recipient, or sub-contractor. The flowchart uses additional nomenclature designating the sender was "User A," and the intended recipient as "User B." The recipient receives a notification that newly received information is available. However, this newly received information is not accessible by the recipient until the recipient answers in QAN. The flowchart shows that different actions are taken depending on the status of the recipient.

If the recipient is a new user, a check at step 124 causes step 130 to be executed. The recipient is a new user if the recipient has never received information from the system.

In other words, if the recipient has never entered QAN into the system the recipient is treated as a new user.

For new users, step 130 checks to make sure that the fax containing the QAN sent to the new user has been successfully transmitted. In other words, the flag set at step 114 of FIG. 1A must be set to TRUE. If so, the recipient, after entering in the QAN, is asked to register. As part of the registration process, the recipient enters information which is used to create the recipient's profile. An example of a web page registration form to accomplish the registration of new users is shown in FIG. 2A. After successfully completing the registration process the user can enter the QAN, as symbolized by step 134.

Returning to step 124, if the recipient is not a new user, then step 126 is executed to check if the sender has a username in the entry for the recipient in the sender's address book. If not, step 132 is executed where the recipient receives a fax, but does not yet have access to the information intended to be transferred. An example of the fax that recipient receives at step 132 is shown in FIG. 2B. This fax instructs the recipient to log on to BuildPoint.com and provides the user with a QAN to enter once logged in in order to receive the electronically transferred information. Alternatively, the recipient can respond by fax as indicated on the example fax of FIG. 2B. Once logged on, the user enters the QAN as symbolized by step 134, as before.

Returning to step 126, if the sender does have the recipient's username in the entry for the recipient in the private address book, then step 128 is executed. At step 128, the information is transferred directly to recipient's in-box, folder, etc. in the recipient's e-mail system. An example of a web page screen where messages are sent to is shown in FIG. 2C. The first five times that a user already having an entry in a public or private address book is sent information according to step 128, step 136 is also executed. In step 136, the recipient's act of entering the QAN and accessing information results in a fax, e-mail, etc. being transmitted back to the sender. The sender is notified to the effect that the recipient has recently joined the verification system so that the sender is given a chance to check on the transmission and receipt of information.

Returning to step 134, after a new user enters a QAN step 144 is executed. At step 144, the recipient, or recipient's representative, is presented a form which asks whether (1) the person responding to this query is, in fact, the intended recipient; (2) whether the person responding to this query is a representative of the intended recipient; or (3) neither the intended recipient or the intended recipient's representative. The person being queried is also informed that the sender will be asked to authenticate and verify any responses of the recipient to the query. An example of such a query is shown in FIG. 2D.

If User B, the recipient, answers (1), step 146 and 142 are performed simultaneously. If User B answers (2), step 160 and 140 are performed simultaneously. If User answers (3), step 154 is performed.

Step 146 is executed whereby an indication of the information appears in the new user's folder in his or her e-mail system. At step 148, the user name of the recipient is entered into the sender's profile for the recipient in association with the name that the sender is using for the recipient. This is necessary because the username (i.e., the computer login name for the user's or recipient's e-mail account) is often different from a legal name that the sender may use for the recipient. Furthermore, this ensures that the next time a similar communication occurs between User A and User B, User B can go directly to Step 128 and save time while maintaining the security of the system. Also, the QAN is disabled so that it will not be used in association with other users.

Next, at step 156, the recipient's profile is updated, and indicated as being updated, in all places where the user name appears. In other words, updates are made in public and private address books, directory listings, recipient lists, etc.

At step 162, the sender is given a chance to update, or correct, the current profile that the system has associated with the recipient. Once the recipient corrects any information, the information is automatically propagated to all entries associated with the recipient in the system.

Step 142 illustrates that the alternate communication backup message to the intended recipient is also sent for the first five times that a user, who has already been entered into an address book, is sent information via the system. This is sent to ensure that the intended recipient is aware that someone has accessed a QAN intended for him or her. If the user accessed the QAN himself or herself, the user would ignore the message, but if not, the user is encouraged by a memo to contact the system to ensure that no malicious activity has occurred. FIG. 2H is an example of this access confirmation memo.

Steps 160, 152, 150 and 158 handle the case where a third-party, User D, responds User D is a new recipient separate from the intended recipient but who is responding on behalf of the intended recipient, User B. At step 160, the QAN is disabled so that no other transmission in the clarification system will use that QAN. At step 152 of FIG. 1B, a note is sent to the sender informing the sender that User D has been registered with the verification system and has responded on behalf of User B. In step 150 and 158 the sender is given the option of adding the new recipient to his or her address book. An example of the status screen used to indicate the new recipient with the verification system is shown in FIG. 2F.

Figure 2F:
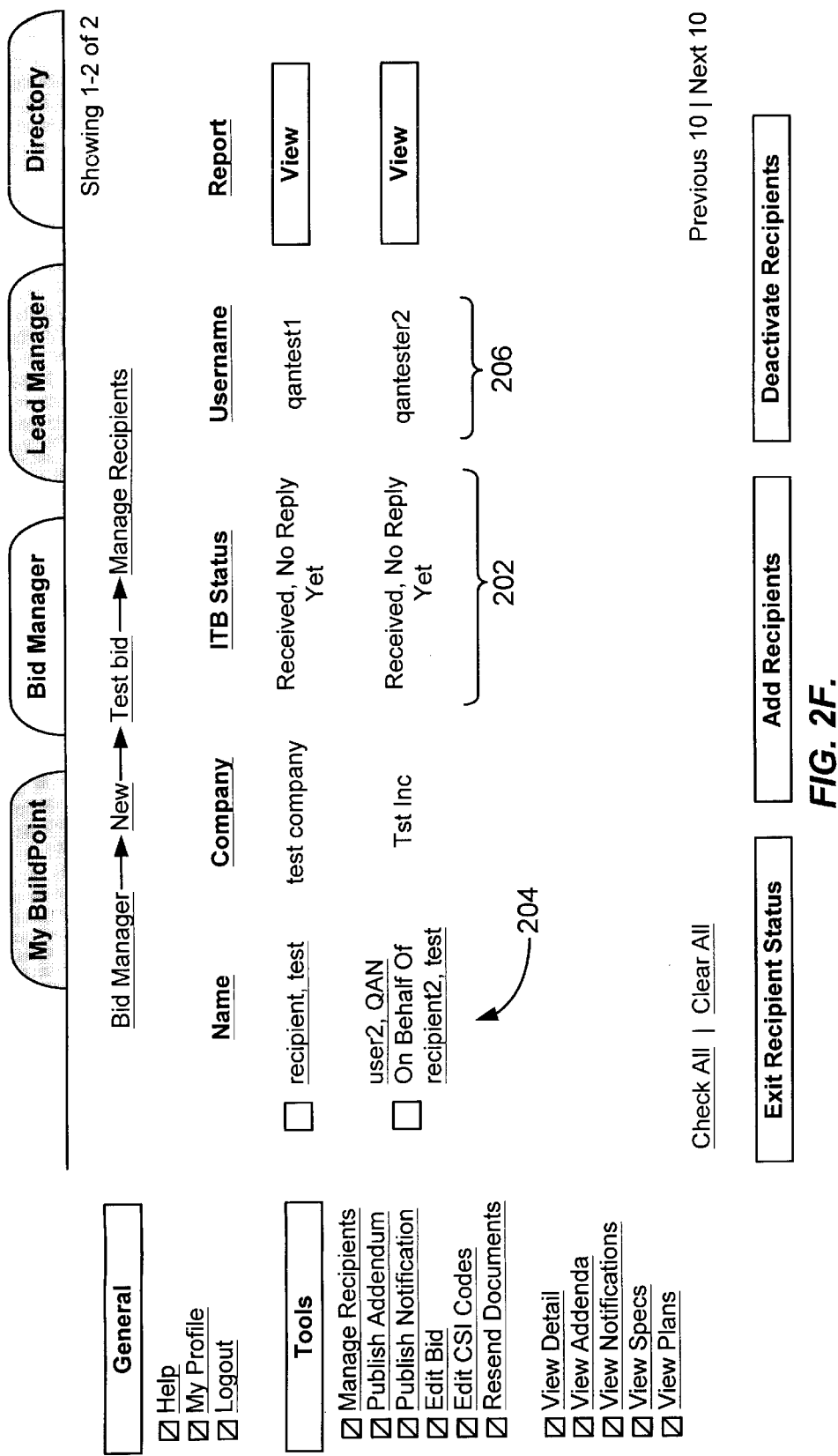
FIG. 2F shows a listing of possible recipients.

In FIG. 2F, entries are shown for two potential recipients of the user "nkghosh" of the company "BuildPoint." The two entries are "recipient, test" and "user2, QAN." The intended recipient was "recipient2, test" but "user2, QAN" responded on his behalf. The sender is notified in this screen of the change in recipient. The status for each potential recipient, who is a new user of the system, is shown at 202. The filled-in username field on 206 indicates that a communication channel has been established between the sender and the two recipients. The status column shows that both senders have received the information transferred, namely the ITB message, but have not yet replied.

At step 140, the recipient is sent (by fax, e-mail, etc.) a copy of an access confirmation based on the current communication profile of the recipient residing in the sender's address book. Step 138 sends the access confirmation to the intended recipient to inform the intended recipient that a response on behalf of the intended recipient (to the information sent by the sender) has been received by the system and accessed by the new recipient. This gives the intended recipient a chance to make sure that no one is undesirably responding on behalf of the intended recipient. An example of such a message is shown in FIG. 2H.

Step 154 is performed if User D who identified himself as someone that does not have access to the transferred information, namely, the bid. Through step 142 and step 140, users who malicious tries to access the system as discouraged to do so, and if they still continue to use the QAN, the security implemented will quickly use an error message to notify the system as well as the sender and intended recipients that the message has fallen into the wrong hands. Under this circumstance, User D is notified that User D can e-mail User A at a specific e-mail address. This allows User D to request that User A add User D to the recipient list separately. An example of such an errormessage sent to User D, is shown in FIG. 2G.

Although the present invention has been discussed with respect to specific embodiments, these embodiments are merely illustrative, and not restrictive, of the invention. The scope of the invention is to be determined solely by the appended claims.

What is claimed is:

1. A method for validating communications between a sending system and a human recipient over a computer network, the method comprising:

associating a network contact address with the human recipient;

causing an initial send of information from the sending system to the human recipient over the computer network;

in response to the step of initiating a send, generating an information access code for accessing the information;

providing the information access code to the human recipient by a method that does not use the network contact address;

the information access code being received without using the contact address; and detecting the submission of the information access code in association with the network contact address before completing the send of information from the sending system to the human recipient over the computer network.

2. The method of claim 1, wherein the network contact address is an e-mail address.

3. The method of claim 1, wherein the method that does not use the network contact address is one of the following: mail, fax, telephone, telegram, videoconference, word-of-mouth.

4. The method of claim 1, further comprising the step of accepting an attestment that the human recipient is the intended receiver before completing the send of information from the sending system to the human recipient.

5. The method of claim 1, further comprising the step of sending backup notification for a send of information to the human recipient, wherein the backup notification is accomplished by a method that does not use the network contact address.

6. The method of claim 5, wherein the step of sending backup notification is repeated for a predetermined number of sends after the step of detecting the submission of the information access code.

7. The method of claim 1, further comprising associating initial information about the human recipient with the network contact address prior to the step of causing an initial send of information;

allowing the human recipient to provide information about the human recipient; and subsequent to the step of detecting the submission of the information access code, performing the step of updating the initial information with the provided information about the human recipient.

\* \* \* \* \*